July 6, 1971   T. S. PLASKETT   3,591,340
METHOD FOR PREPARING HIGH PURITY CRYSTALLINE
SEMICONDUCTIVE MATERIALS IN BULK
Filed July 11, 1968   2 Sheets-Sheet 1
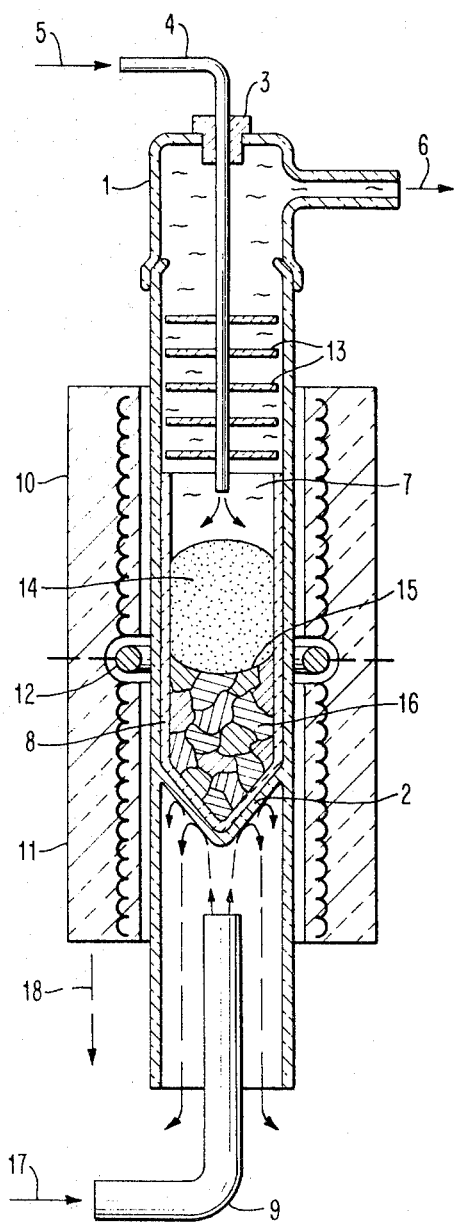
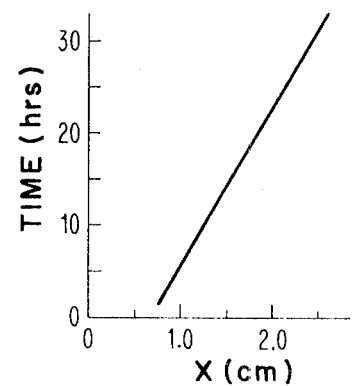
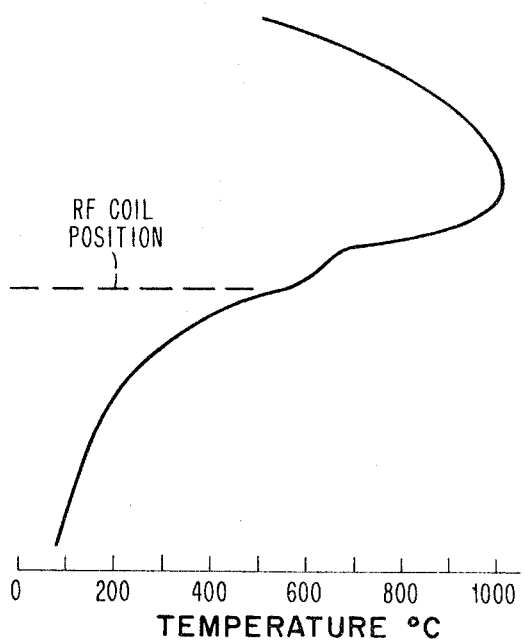
INVENTOR.
THOMAS S. PLASKETT
BY Hansel L. McG...
ATTORNEY

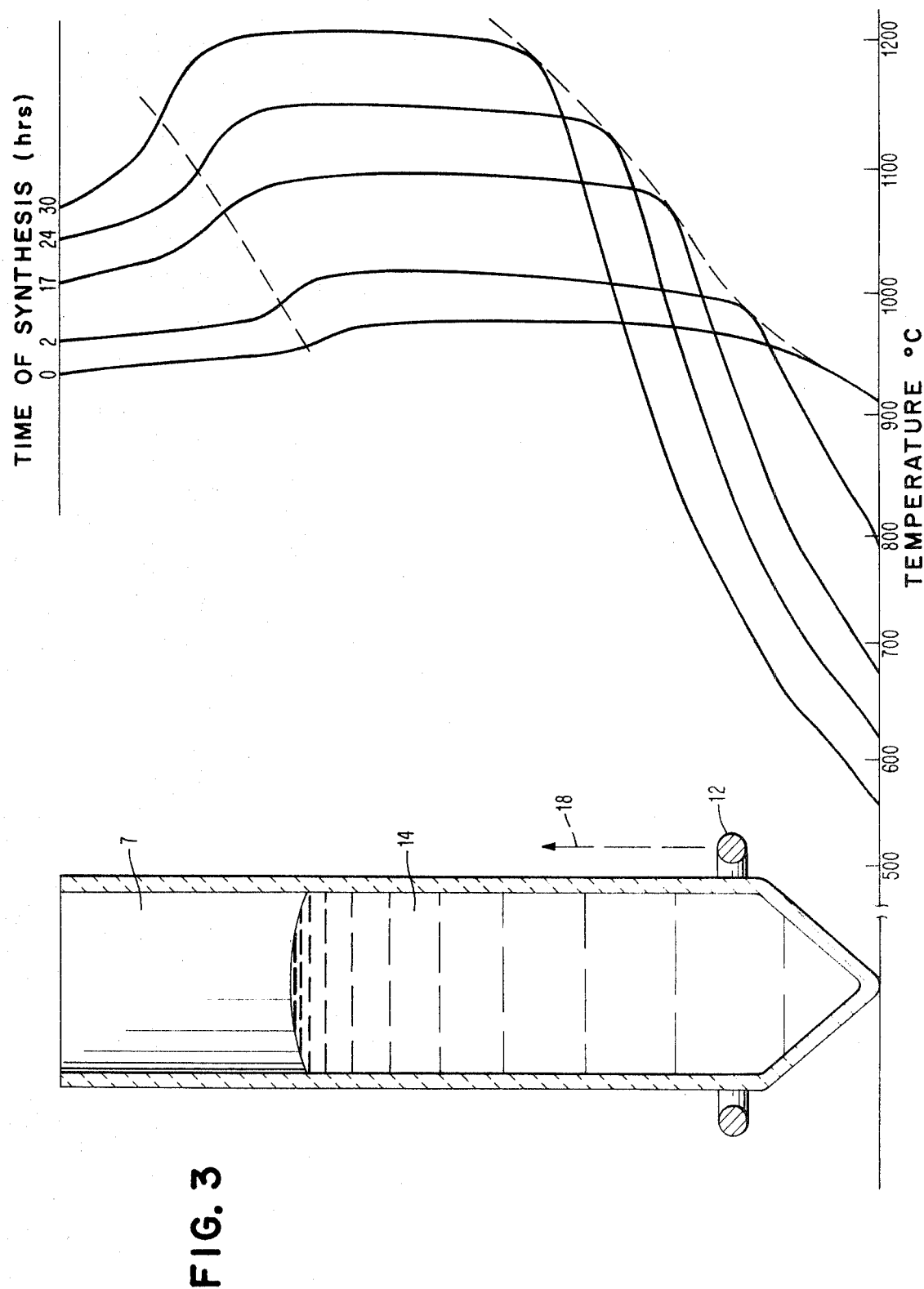

United States Patent Office 3,591,340
Patented July 6, 1971

3,591,340
METHOD FOR PREPARING HIGH PURITY CRYSTALLINE SEMICONDUCTIVE MATERIALS IN BULK
Thomas S. Plaskett, Ossining, N.Y., assignor to International Business Machines Corporation, Armonk, N.Y.
Filed July 11, 1968, Ser. No. 744,107
Int. Cl. C01b 27/00, 31/36; C01g 9/08
U.S. Cl. 23—204                              10 Claims

ABSTRACT OF THE DISCLOSURE

Groups III-A—V-A and II-B—VI-A compounds and alloys thereof are prepared, for example, by flowing a gaseous Group V compound into a bath of a molten Group III-A element having a temperature profile established thereabout. A container containing a molten metal or a mixture of said metals is placed in a vertical furnace, about which a steep temperature gradient is established along its length. A gaseous compound of a Group V-A element or a mixture of gaseous Group V-A compounds and an inert gas is permitted to flow into the molten Group III-A metal. A temperature gradient along the length of the crucible causes the Group V-A element to react with the molten Group III-A metal and the reaction product therefrom dissolves in the molten metal. The lower surface of the crucible is cooled by a cool air blast which establishes convection currents within the molten metal so that as the solubilized Group III-A—V-A compound moves downwardly in the crucible it mixes with the molten Group III-A compound, is cooled and crystallizes out of the molten metal as a highly pure crystalline ingot of the specific III-A—V-A composition. It has also been found that pure silicon carbide can be prepared in a similar manner. For example, a mixture of methane and an inert gas is permitted to flow into molten silicon which is similarly subjected to a temperature gradient. The materials formed by the process of this invention are found to be of very high purity.

BACKGROUND OF THE INVENTION

Group III-A—V-A compositions have emerged over recent years as a potentially useful semiconductor electroluminescent material. Electroluminescent diodes made of these materials are the most immediately promising solid state sources of visible light. They are bright and reasonably efficient sources of red and green light (approaching 1% quantum efficiency). They can be used for displays, front panel indicator lights, and circuit failure indicator lights. The exploitation of these materials has been deterred, however, by the lack of suitable procedures for control growth of bulk single crystals. High purity III-V compositions, e.g. GaAs, are also of value as source materials for subsequent single crystal growth for use in injection lasers and Gunn devices, etc.

The III-A—V-A and II-B—VI-A compounds can be prepared easily by precipitation from the Group II or III metals or other metal solvents in which it has an appreciable solubility. However, the crystals produced in this way are usually in the form of thin dendritic platelets of various sizes and morphologies and it is difficult to form reproducibly large, uniformly doped platelets that are essential for device applications.

Another method of preparing these compounds is by the Faraday method in which the less volatile Group III component is placed in a crucible in a sealed enclosure. The more highly volatile Group V-A component is located at another place at the sealed enclosure preferably so that it is fused through the bottom of the enclosure. The enclosure is differentially heated such that the crucible is heated to the melting point of the compound and the area of the sealed enclosure is heated at least to a temperature that the vapor pressure of the more highly volatile component element is equal to the partial vapor pressure of this component above the desired compound at the melting point of the compound. This method has the disadvantages in that the pressure within the sealed enclosure must be critically controlled, the product is formed as a platelet as in the generalized method above, and the product must be further purified due to the occlusion of molten metal in the resulting product. Prior art methods describing an improved Faraday method method can be found in U.S. Pat. Nos. 3,366,454 and 3,361,530. while the product obtained from the method contained in the above patent applications produces a purer product, they do not provide the product in bulk form, e.g., as ingots. Additionally, they have the same attendant disadvantages as in the above described Faraday method.

Another method of preparing pure III-A—V-A compounds is by solution regrowth in the traveling solvent method disclosed in a publication to J. D. Broder and G.A. Wolff, Journal of the Electrical Chemical Society, 110, 385 (1963). In the Broder and Wolff method, a high temperature saturated III-A—V-A compound zone is passed through a composite of liquid Group III-A metal and solid III-A—V-A compound. By the solution of the III-A—V-A compound at the leading edge of the zone and precipitation at the trailing edge, a solid ingot with large grains is produced. The new method of the present invention is modification of the above-mentioned solution regrowth method. However, the Broder and Wolff method requires an original source of the III-A—V-A compound generally prepared by one of the above described methods, whereas the present method prepares the desired compound in ingots directly, that is, without the need of carrying out a second mode of preparing the III-A—V-A compound. The Broder and Wolff method has the disadvantage of having rippling of the ingots, i.e., the ingot will grow in two or more separate sections, separated by thin columns or ripples of the Group III metals.

SUMMARY OF THE INVENTION

The invention relates to a new method for the direct growth of pure crystalline II-B—VI-A and III-A—V-A compounds in bulk form. The process uses a modified "solution growth" method to dissolve and crystallize the II-B—VI-A and III-A—V-A compounds at moderate temperatures and at low pressure. A container containing the Group III-A or II-B elements, e.g. (B, Al, In, Ga, Zn, Cd, Hg) or a mixture thereof, is placed in a vertical furnace having an inlet at its top for the admission of a gaseous Group V-A or VI-A compound, e.g. ($PH_3$, $AsH_3$, As, Sb, S, Se, Te, etc.) or a mixture thereof and having at its lower extreme an inlet for the admission of a cooling air blast to cool the lower surfaces of said crucible. Having established the container and its contents in the furnace the container is heated to a temperature to render the Group III-A or II-B metal to a molten state. The gaseous Group V-A or VI-A compound is permitted to flow in from the top of the furnace and impinge on the surface of the molten liquid at which point a reaction occurs between the molten metal and the gaseous compounds. The temperature at the surface of the molten metal is maintained above the saturation temperature to insure that its surface is not crusted over with the reaction products thereby stopping the reaction. A temperature gradient is established so that the reaction product dissolves in the molten melt and mixes therethrough to the cooler regions of the container and crystallizes out of solution as an ingot.

According to another aspect of the invention, Group II-B—VI-A compounds and alloys as well as silicon carbide are similarly prepared. In the case of silicon carbide an organic hydrocarbon gas such as methane is flowed into molten silicon. In the preparation of the Group II–B—VI–A compounds, the volatile Group VI elements are admitted into the crucible to react with the molten Group II–A element.

OBJECTS OF THE INVENTION

It is an object of the present invention to provide a new method for the preparation of pure crystalline ingots of III–A—V–A compounds and II–B—VI–A compounds.

Another object of the invention is to provide a new method for the preparation of crystalline ingots of silicon carbide.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 1 is a schematic drawing of the apparatus depicting the vertical furnace and the container and its contents.

FIG. 2 is a schematic drawing showing the temperature profile of the container during the preparation of III–V compounds and silicon carbides.

FIG. 3 is a schematic drawing of the crucible with its initial charge and shown at the right of the drawing is the temperature profile in the crucible at various times after the start of the synthesis.

DESCRIPTION OF THE PREFERRED EMBODIMENT

The method according to the invention is particularly advantageous for the production of compounds of a type III–A—V–A; that is a compound of an element of the third group with an element of the fifth group of a periodic system. This method is also applicable to compounds of a type II–B—VI–A; that is compounds of an element of the second group with an element of the sixth group of a periodic system, and similarly the method is advantageous for the production of silicon carbide. In addition, alloys of the above compounds can similarly be prepared. For example, III–A—III–A—V–A (GaAlAs) and

III–A—V–A—V–A alloys (InAsP) are prepared by having a mixture of the group III–A metal in the molten state of the

III–A—V–A—V–A alloys; a mixture of the V–A—V–A gases is admitted into the molten Group III–A metal. Single crystal ingots can be grown by seeding the reaction mixture with a single crystal as a nucleating center. Similarly a twinned single crystal ingot is grown by seeding with a twinned single crystal.

The materials used, e.g., Groups II–B, III–A, V–A and VI–A elements as well as Si and hydrocarbons in this invention are of high purity and are obtained commercially. Among the materials that may be used for containers are crucibles prepared from alundum, graphite, sapphire, quartz, boron-nitride, and aluminum-nitride.

The method requires a solvent that has an appreciable solubility for the desired product and the non-gaseous moiety of the compound in the liquid but has no solubility in the solid compound. Suitable solvents can be selected from molten Group II–B and Group III–A elements or other suitable solvents meeting the above requirements. For example where the formation of $B_6P$ is desired molten nickel may be the solvent.

As an example, the method will be described with reference to production of gallium phosphide (GaP) and with reference to the device schematically illustrated in FIG. 1.

Used as a vertical enclosure is a quartz cylinder 1 having a tapered inner section 2 within its chamber. Quartz cylinder 1 has an opening at its upper end 3 through which a gas conducting quartz tube 4 is inserted to admit a gaseous material such as phosphine 5 into its inner chamber. There is also an outlet 6 through which unreacted phosphine and the gaseous vapor by-products are permitted to escape. A pyrolytic boron-nitride crucible 7 having a 45° tapered bottom 8 is fitted within the tapered section 2 of quartz tube 1. The quartz tube 1 is thin-walled and is fitted very closely about the crucible 7. At the lower end of quartz cylinder 1, there is an inlet 9 which permits a strong inner cooling blast to impinge upon the tapered section 2 of the cylinder 1. Wound about the outer circumference of quartz cylinder 1 are auxiliary furnaces 10 and 11 and a single turn RF coil 12. Above the crucible 7 are a series of heat baffles 13 which serve to maintain the temperature gradient within the system relatively constant. The essential features of the above design are the vertical positioning of the container 7, intense concentrated heating at the growing interface and strong cooling at the bottom of the container 7. With these features, the requirements of a steep temperature gradient at the solid-liquid interface and good mixing in the liquid, primarily by convection currents, are met.

Prior to performing the method, the system described above is baked out in a vacuum at about 800° C. A charge of about 30 grams of gallium is then placed in the crucible 7. The system is then heated to a temperature such that the temperature at the interface of the molten gallium 14 and the gas 5 is sufficient to dissolve the reactant product formed in the interface. At the same time the strong air-cooling blast 17 is permitted to impinge on the tapered section 2 of cylinder 1. Phosphine 6 premixed with 80% by volume of argon, is permitted to flow through inlet 4 onto the surface of the molten metal charge 14. The $PH_3$ reacts with the molten Ga to produce GaP which dissolves in the molten melt 14. As the dissolved GaP mixes in the solvent and moves downwardly in container 7 the GaP crystallizes as a bulk ingot 16. The gaseous mixture is flowed into the molten material 14 at a rate of about 90 to 100 ml./min. After a time sufficient to saturate the gallium with phosphorus, about 4 hours, cylinder 1 and its contents is made to move relative to RF coil 12, as indicated by arrow 18, and travels at a rate of about 1.8 cm./day. The movement of the RF coil 12 allows the solid-liquid interface 15 to be concentratedly and intensely heated by the RF coil 12. This heating allows for the continuous creation of convection currents in the solution, thereby obtaining maximum mixing of the dissolved product and the solvent. The auxiliary furnaces 10 and 11, located above and below the RF coil 12, control the shape of the solid profile, shown in FIG. 2, along the axis of the system. The coil 12 is initially placed just above the tapered section 8 of crucible 7. The upper auxiliary furnace 10 is maintained at a temperature of about 1000° C. and the lower furnace 11 is maintained at a temperature of about 800° C. The peak temperature shown in FIG. 2 is between about 950–1200° C., a temperature sufficient to dissolve and maintain the gallium phosphide, produced at the surface, in solution in the molten gallium 14. The temperatures are maintained well below the melting point of GaP 16, e.g. (about 1500° C.).

It should be understood that where the formation of the product has reaction temperatures higher than those disclosed above, the pressure of the reacting gas must be increased commensurately with any increase in temperature. The system described has the advantage of allowing the reaction occurring therein to proceed at relatively low temperatures, thereby reducing the amount of contamination in the product by the container. The system has an added advantage in that the gaseous mixture is admitted into the chamber at a high velocity and thus prevents the decomposition of the gas mixture prior to its reacting with the liquid element. A further advantage of the system is that it is an open one, so that pressures therein need not be meticulously controlled. The open system allows for the purification of the gaseous materials just prior to entering the system, a feature not permitted in closed systems such as shown in the prior art. Further, doping of the semiconductive material can be done simultaneously since a gaseous dopant can be admitted into the system along with the gaseous reactant.

The gallium phosphide ingots grown by the method described above are found to be of very high purity, there being practically no entrapped gallium present. Because the reaction occurs at a relatively low temperature, the ingot was free from silicon contamination.

In a similar manner, an alloy of gallium arsenide and phosphorous can be prepared. The gas mixture contains equal parts of arsine and phosphine and 80% argon. A similar temperature profile is maintained as indicated in the above examples. Ingots of gallium arsenic phosphide can be grown of very high purity.

The temperature profiles in the container at various times after the start of synthesis are shown in FIG. 3. A schematic drawing of the container 7 with the initial Ga charge 14 is shown at the right of the temperature profile. Arrow 18 depicts the relative motion of RF coil 12 to the container 7. The temperature profile of the contents 14 of the container 7 is measured by inserting a thermocouple therein and periodically recording the temperature changes produced by the thermocouple. The position of the RF coil 12 at the start of synthesis is just above the tapered portion of the container. Before $PH_3$ is introduced into the reactor there is only a slight temperature gradient in the liquid. After about 2 hours of synthesis a steep and almost linear temperature gradient region is observed at the bottom of the container. The gradient changes abruptly to an isothermal region. This linear gradient region is interpreted to be the temperature profile in the solid GaP 16 (FIG. 1). The isothermal region corresponds to the temperature profile in the molten Ga-GaP solution 14. The abrupt change in slope denotes the position of the solid-liquid interface 15 (FIG. 1). Above the isothermal region, a non-linear temperature gradient exists and the change to this region denotes the top molten surface 14 (FIG. 1). Both the position of the lower and upper inflection points increase upward as synthesis proceeds. A plot of the position of the solid-liquid interface in centimeters with time is shown in FIG. 4. After the ingot of GaP has been synthesized, the growth rate of this reaction, $f$, is shown to be linear and has a value of about 1.4 cm./day, a little slower than the coil travel rate of about 1.8 cm./day.

The value of the temperature gradient in the solid, $G_s$, as indicated, are extremely high, e.g., between 210 to 380° C./cm. The exact value at the various positions are shown in Table I below.

The value of the temperature gradient in the liquid at the solid-liquid interface can be calculated from the equation, $$G_L K_L = G_s K_s - \rho L f$$

where $G_L$ and $G_s$ the temperature gradient in the liquid and solid respectively, $K_L$ and $K_s$ the thermal conductivity in the liquid and the solid $\rho$ the density of liquid
$L$ the latent heat of fusion
$f$ the growth rate Since the growth rate is so small, the last term can be neglected. Because the ratio of $K_s$ to $K_L$ is about unity near the melting point, the temperature gradient in the liquid can be approximated by the gradient in the solid.

The other values shown above in Table I are the interface temperature and the reaction surface temperature. All values increase slightly as the synthesis of the compound increases. The value of $G_L/f$ for the onset of constitutional supercooling, i.e., the limiting condition for solid continuous growth of the solid from solution, calculated for the various positions is also shown. The values are just about equal to theoretical value predicted in Table II below.

TABLE II.—CALCULATED VALUES OF G/R FOR NO CONSTITUTIONAL SUPERCOOLING

| Temperature: | Mole fraction of Ga in solution | $m$,° C./ mole fraction | G/R |
|---|---|---|---|
| 900 | .99 | | |
| 1,000 | .97 | 5,600 | $1.1 \times 10^8$ |
| 1,100 | .95 | 2,700 | $5.1 \times 10^7$ |
| 1,200 | .89 | 1,700 | $3.0 \times 10^7$ |
| 1,300 | .81 | 1,300 | $2.1 \times 10^7$ |

The mole fraction values are recalculated from C. D. Thurmonds Journal of Physics and Chemical Solids, vol. 26. 785–802, Pergamon Press 1965, as $$\frac{\text{mole of Ga}}{\text{moles of Ga} + \text{moles of GaP}}$$

The values of $m$ is the slope of the liquidus line for the phase diagram of GaP-Ga, as calculated from Thurmond.

While the invention has been described above for the preparation of GaP, it should be obvious to those skilled in the art that other Group III–V compounds and alloys thereof can be similarly prepared by routinely altering the reaction temperatures and gas pressures for the particular reaction. It should be similarly obvious that from the above teachings, one can also prepare compounds from Group II and VI elements and their alloy, as well as SiC from molten silicon and a gaseous organic hydrocarbon.

This invention further teaches a design of a system necessary to obtain severe growth parameters, i.e., a high temperature gradient at the solid-liquid interface, and to obtain good mixing of the molten solvent and the dissolved product, which has not heretofore been obtainable.

While the invention has been particularly shown and described with reference to preferred embodiments thereof, it will be understood by those skilled in the art that various changes in form and details may be made therein without departing from the spirit and scope of the invention.

What is claimed is:

1. A method of preparing ingots of high purity crystal-

TABLE I.—GROWTH PARAMETERS

| Time of synthesis, (hrs.) | Interface position from core, (cm.) | Temp. of solid-liquid interface, ° C. | Temp. of reaction surface, ° C. | $G_s$, °C./cm. | $f$, cm./sec. | $G_L/f$ |
|---|---|---|---|---|---|---|
| 0 | 0 | | | | | |
| 2 | .98 | 988 | 1,016 | 210 | $1.7 \times 10^{-5}$ | $1.3 \times 10^7$ |
| 17 | 1.55 | 1,080 | 1,092 | 320 | $1.7 \times 10^{-5}$ | $1.9 \times 10^7$ |
| 23.5 | 2.01 | 1,137 | 1,145 | 380 | $1.7 \times 10^{-5}$ | $2.3 \times 10^7$ |
| 29.5 | 2.47 | 1,188 | 1,200 | 380 | $1.7 \times 10^{-5}$ | $2.3 \times 10^7$ | line III–A—V–A semiconductive materials and alloys thereof including the steps of:
  (a) heating a vertical cylinder having disposed therein a charge comprising at least one group III–A element which is a solvent for said III–A—V–A semiconductive material and for a gaseous group V–A element containing compound, at a temperature sufficient to cause said group III–A element to become a molten liquid,
  (b) flowing at least one gaseous group V–A element containing compound at a velocity of about 90 ml./min. to about 100 ml./min. into said vertical cylinder and impinging the same onto the surface of said molten group III–A element to react therewith, thereby producing a solid group III–A—V–A material as a reaction product at the interface of said molten III–A element and said gaseous V–A element containing compound,
  (c) heating said cylinder with a single R.F. coil at the base of said molten group III–A element to establish and maintain strong convection currents in said molten group III–A element thereby causing said solid groups III–A—V–A material to be mixed with said molten group III–A element and to be dissolved therein,
  (d) simultaneously cooling the bottom of said cylinder to cause said group III–A—V–A material to crystallize from said molten group III–A element in the form of a crystalline ingot of said groups III–A—V–A material, and to establish and maintain steep temperature gradients in a range between about 210° C./cm. to about 380° C./cm. at the interface of said ingot and said molten group III–A element, and thereafter
  (e) continuously heating said cylinder with said R.F. coil at the interface of said molten group III–A element said growing crystalline ingot of said groups III–A—V–A material as in step (c) until a large solid ingot is obtained.

2. A method according to claim 1 wherein said group III–A element is Ga and said gaseous reactant is $PH_3$.

3. A method according to claim 1 wherein said group III–A elements are Ga and Al and said gaseous reactant is $PH_3$.

4. A method according to claim 1 wherein said group III–A elements are Ga and In and said gaseous reactant is $PH_3$.

5. A method according to claim 1 wherein said group element is Ga and said gaseous reactants are $AsH_3$ and $PH_3$.

6. A method according to claim 1 wherein said temperature in melt has a peak temperature between about 950° C. and about 1200° C.

7. A method of preparing ingots of high purity crystalline II–B—VI–A semiconductive materials and alloys thereof including the steps of:
  (a) heating a vertical cylinder having disposed therein a charge comprising at least one group II–B element which is a solvent for said II–B—VI–A semiconductive material and for a gaseous group VI–A element, at a temperature sufficient to cause said group II–B element to become a molten liquid,
  (b) flowing at least one gaseous group VI–A element at a velocity of about 90 ml./min. to about 100 ml./min. into said vertical cylinder and impinging the same onto the surface of said molten group II–B element to react therewith, thereby producing a solid group II–B—VI–A material as a reaction product at the interface of said molten II–B element and said gaseous VI–A element,
  (c) heating said cylinder with a single R.F. coil at the base of said molten group II–B element to establish and maintain strong convection currents in said molten group II–B element thereby causing said solid groups II–B—VI–A material to be mixed with said molten group II–B element and to be dissolved therein,
  (d) simultaneously cooling the bottom of said cylinder to cause said group II–B—VI–A material to crystallize from said molten group II–B element in the form of a crystalline ingot of said groups II–B—VI–A material, and to establish and maintain steep temperature gradients in a range between about 210° C./cm. to about 380° C./cm. at the interface of said ingot and said molten group II–B element, and thereafter
  (e) continuously heating said cylinder with said R.F. coil at the interface of said molten group II–B element and said growing crystalline ingot of said groups II–B—VI–A material as in step (c) until a large solid ingot is obtained.

8. A method according to claim 7 wherein said II–B element is selected from the group consisting of Zn, Cd, and Hg and said VI–A material is selected from the group consisting of S, Se and Te.

9. A method of preparing ingots of high purity crystalline silicon carbide including the steps of:
  (a) heating a vertical cylinder, having disposed therein a charge consisting of silicon at a temperature sufficient to cause said silicon to become a molten liquid,
  (b) flowing a gaseous hydrocarbon at a velocity of about 90 ml./min. to 100 ml./min. into said vertical cylinder and impinging the same onto the surface of said molten silicon to react therewith, thereby producing solid silicon carbide as a reaction product at the interface of said molten silicon and said gaseous hydrocarbon,
  (c) heating said cylinder with a single R.F. coil at the base of said molten silicon to establish and maintain strong convection currents in said molten silicon thereby causing said solid silicon carbide to be mixed with said molten silicon and to be dissolved therein,
  (d) simultaneously cooling the bottom of said cylinder to cause said silicon carbide to crystallize from said molten silicon in the form of a crystalline ingot of said silicon carbide and to establish and maintain steep temperature gradients in a range between about 210° C./cm. to about 380° C./cm. at the interface of said ingot and said molten silicon, and thereafter
  (e) continuously heating said cylinder with said R.F. coil at the interface of said molten silicon and said growing crystalline ingot of said silicon carbide as in step (c) until a large ingot of SiC is obtained.

10. A method according to claim 9 wherein said hydrocarbon is methane.

References Cited
UNITED STATES PATENTS

| | | | |
|---|---|---|---|
| 3,279,891 | 10/1966 | Wenzel | 23—204 |
| 3,335,084 | 8/1967 | Hall | 23—315 |
| 3,386,866 | 6/1968 | Ebert et al. | 148—1.5 |
| 3,462,320 | 8/1969 | Lynch et al. | 23—204 |

OSCAR R. VERTIZ, Primary Examiner

H. S. MILLER, Assistant Examiner

U.S. Cl. X.R.

23—134, 135, 208, 273